US008964136B2

(12) United States Patent
Nakahara et al.

(10) Patent No.: US 8,964,136 B2
(45) Date of Patent: Feb. 24, 2015

(54) ACTIVE SHUTTER GLASSES COMPRISING A HALF-WAVE PLATE DISPOSED AT AN OUTER SIDE OF A LINEAR POLARIZING ELEMENT AND A STEREOSCOPIC IMAGE PROJECTION SYSTEM

(75) Inventors: Takahiro Nakahara, Osaka (JP); Shun Ueki, Osaka (JP); Kozo Nakamura, Osaka (JP); Akira Sakai, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 252 days.

(21) Appl. No.: 13/640,124

(22) PCT Filed: Mar. 3, 2011

(86) PCT No.: PCT/JP2011/054923
§ 371 (c)(1),
(2), (4) Date: Dec. 5, 2012

(87) PCT Pub. No.: WO2011/125400
PCT Pub. Date: Oct. 13, 2011

(65) Prior Publication Data
US 2013/0083261 A1 Apr. 4, 2013

(30) Foreign Application Priority Data
Apr. 9, 2010 (JP) ................................. 2010-090704

(51) Int. Cl.
*G02F 1/1335* (2006.01)
*G02B 27/26* (2006.01)
(Continued)

(52) U.S. Cl.
CPC ............ *G02B 27/26* (2013.01); *G02B 27/2264* (2013.01); *G03B 35/26* (2013.01); *H04N 13/0438* (2013.01); *H04N 2213/008* (2013.01)

USPC ................................................ 349/15; 349/13

(58) Field of Classification Search
USPC ....................................................... 349/13, 15
See application file for complete search history.

(56) References Cited

U.S. PATENT DOCUMENTS

| 5,515,186 A | 5/1996 | Fergason et al. |
| 2004/0012851 A1 | 1/2004 | Sato et al. |

(Continued)

FOREIGN PATENT DOCUMENTS

| JP | 10-232365 | 9/1998 |
| JP | 10-243420 | 9/1998 |

(Continued)

OTHER PUBLICATIONS

International Search Report for PCT/JP2011/054923, mailed Apr. 19, 2011.

(Continued)

*Primary Examiner* — Paul Lee
(74) *Attorney, Agent, or Firm* — Nixon & Vanderhye, P.C.

(57) ABSTRACT

The present invention provides active shutter glasses including shutters in which orientations of their components are freely determined, and provides a stereoscopic image projection system. The present invention provides active shutter glasses for a stereoscopic image projection system, the active shutter glasses comprising: a right-eye shutter; and a left-eye shutter, wherein the right-eye shutter and the left-eye shutter each include a liquid crystal layer and a linear polarizing element, at least one of the right-eye shutter and the left-eye shutter includes a layer adopted to change a vibration direction of polarized light, the linear polarizing element is provided at the outer side of the liquid crystal layer, and the layer adapted to change a vibration direction of polarized light is provided at the outer side of the linear polarizing element.

8 Claims, 13 Drawing Sheets

(51) Int. Cl.
*G02B 27/22* (2006.01)
*G03B 35/26* (2006.01)
*H04N 13/04* (2006.01)

(56) References Cited

U.S. PATENT DOCUMENTS

| | | | |
|---|---|---|---|
| 2005/0083573 A1* | 4/2005 | Itoh et al. | 359/487 |
| 2005/0264904 A1 | 12/2005 | Sato et al. | |
| 2010/0302634 A1* | 12/2010 | Jung | 359/465 |
| 2011/0317082 A1* | 12/2011 | Saitoh et al. | 349/13 |
| 2013/0063670 A1 | 3/2013 | Ueki et al. | |

FOREIGN PATENT DOCUMENTS

| | | |
|---|---|---|
| JP | 61-227498 | 10/1998 |
| JP | 11-98537 | 4/1999 |
| JP | 2001-330731 | 11/2001 |
| JP | 2003-75773 | 3/2003 |
| JP | 2008-083115 | 4/2008 |
| WO | WO 2009/037940 | 3/2009 |
| WO | WO 2010/098341 | 9/2010 |
| WO | WO 2010098341 A1 * | 9/2010 |

OTHER PUBLICATIONS

International Search Report for PCT/JP2011/056593, mailed Jun. 21, 2011.
Written Opinion for PCT/JP2011/056593, mailed Jun. 21, 2011.
Journal of the Institute of Television Engineers of Japan, 1989, vol. 43, No. 8, pp. 755-762.

* cited by examiner

ACTIVE SHUTTER GLASSES COMPRISING A HALF-WAVE PLATE DISPOSED AT AN OUTER SIDE OF A LINEAR POLARIZING ELEMENT AND A STEREOSCOPIC IMAGE PROJECTION SYSTEM

This application is the U.S. national phase of International Application No. PCT/JP2011/054923 filed 3 Mar. 2011 which designated the U.S. and claims priority to JP Patent Application No. 2010-090704 filed 9 Apr. 2010, the entire contents of each of which are hereby incorporated by reference.

TECHNICAL FIELD

The present invention relates to active shutter glasses and a stereoscopic image projection system. More specifically, the present invention relates to active shutter glasses suitable for a stereoscopic image projection system including a liquid crystal display device, and relates to a stereoscopic image projection system.

BACKGROUND ART

An anaglyph system, a passive system, an active system, and the like are known as a stereoscopic image projection system using glasses. An anaglyph system has extremely low display quality and causes crosstalk. Both a passive system and an active system use polarizing glasses.

A passive system allows lightweight polarizing glasses to be manufactured at low cost, but needs different pixels to be used to generate an image for left eye and an image for right eye. For this reason, 3D vision display needs spatial resolution twice as high as that of usual two-dimensional vision display. Therefore, stereoscopic vision generally has lower resolution. The display quality thereof is also lower than that of an active system. Further, the stereoscopic vision display needs a polarizing element such as a λ/2 plate to be patterned in each pixel, which results in an increase in the cost of the display device.

An active system has excellent display performance. For example, if the spatial resolution of a video display device (hereinafter, also referred to as "3D display device") for a stereoscopic image projection system is full high-definition of 1920×1080, stereoscopic display is possible with full HD resolution as is. Further, the principal performance required for an active system 3D display device is a high frame rate and high image processing capacity, and current high-end video display devices can also satisfy these requirements. That is, the active system 3D display device can be offered as a 3D display device even in a stage prior to popularization of 3D contents without introducing a special member to the video display device.

Hereinafter, polarizing glasses used in an active system are also referred to as "active shutter glasses".

As a stereoscopic image projection system employing an active system, for example, a technology using active shutter glasses having a pair of polarizers and liquid crystals disposed between the pair of polarizers is disclosed (e.g., see Patent Literature 1).

In recent years, liquid crystal display devices have been put to practical use as video display devices having features of a thin profile, a light weight, and low power consumption, and they have been widely used in various fields.

In liquid crystal display devices, technique for improving the visibility through polarizing sunglasses is disclosed.

For example, Patent Literature 2 discloses a liquid crystal display device including a liquid crystal display panel, a first polarizer, a second polarizer, and a half-wave plate. The liquid crystal display panel includes two substrates and liquid crystals disposed between the substrates. The polarizer (e.g. upper polarizer) is disposed on a side of one of the two polarizers which is opposite to the side that faces the liquid crystals of the liquid crystal display panel. The half-wave plate is disposed on the polarizer. The direction of a fast axis of the half-wave plate is set such that a polarization direction of light coming from a transmission axis of the polarizer is rotated by the range of 90±15 [°].

CITATION LIST

Patent Literature

Patent Literature 1: JP 61-227498 A
Patent Literature 2: JP 2008-83115 A

Non Patent Literature

Non Patent Literature 1: Hatada, Saida, "Depth Factor Perception and Mechanism", Institute of Television Engineers of Japan, 1989, Vol. 43, No. 8, p. 755-762

SUMMARY OF INVENTION

Technical Problem

However, in conventional stereoscopic image projection systems employing an active system, especially when a landscape oriented 3D display device is used, display quality degrades in right and left regions of a screen in particular. Specifically, light leakage, tint variation, a reduction in contrast ratio (CR), or crosstalk may occur.

In order to solve such problems, components of left and right shutters may be arranged so that left-side and right-side viewing angles of the shutters are larger than upper and lower viewing angles, and the viewing angle characteristics of the left and right shutters may be symmetric to each other. However, in the active conventional stereoscopic image projection system, including a liquid crystal display device, as shown in FIG. 22, a transmission axis $317t$ of a front polarizer 317 of a liquid crystal display device 311 needs to be identical with a transmission axis $324t$ of an outer polarizing element 324 of an active shutter glasses 320. For this reason, for example, both left and right shutters of the glasses 320 have viewing angle characteristics (CR characteristics) as shown in FIG. 23. Transmissivity of the two linear polarizing elements stacked on each other at a relative angle of θ is proportional to the square of cos θ. Therefore, the brightness of the screen is reduced with an increase in angle between the transmission axis $317t$ and the transmission axis $324t$. Thus, in a conventional system including a liquid crystal display device, orientations of components of the left and right shutters are not able to be freely determined.

The present invention has been made in view of the above described circumstances, and is aimed to provide active shutter glasses including shutters in which orientations of their components are freely determined, and to provide a stereoscopic image projection system.

Solution to Problem

The present inventors have made various investigations on active shutter glasses including shutters in which orientations of their components are freely determined, and they have noted a layer (azimuthal polarizer) adapted to change a vibration direction of polarized light. At least one of the left and right shutters includes a liquid crystal layer, a linear polarizing element formed at the outer side of the liquid crystal layer, and an azimuthal polarizer formed at the outer side of the linear polarizing element. Thereby, the above-described problems have been solved, leading to completion of the present invention.

That is, the present invention provides active shutter glasses for a stereoscopic image projection system, the active shutter glasses comprising: a right-eye shutter; and a left-eye shutter, wherein the right-eye shutter and the left-eye shutter each include a liquid crystal layer and a linear polarizing element, at least one of the right-eye shutter and the left-eye shutter includes a layer adopted to change a vibration direction of polarized light, the linear polarizing element is provided at the outer side of the liquid crystal layer, and the layer adapted to change a vibration direction of polarized light is provided at the outer side of the linear polarizing element.

The configuration of the active shutter glasses of the present invention is not especially limited by other components as long as it essentially includes the above-mentioned components.

Preferable embodiments of the active shutter glasses of the present invention are described in detail below.

The layer adapted to change a vibration direction of polarized light preferably changes a vibration direction of incoming polarized light into a direction parallel to a transmission axis of the linear polarizing element. Thereby, a decrease in brightness can be effectively suppressed.

The layer adapted to change a vibration direction of polarized light may be a λ/2 plate.

The layer adapted to change a vibration direction of polarized light may be a liquid crystal film including nematic liquid crystal molecules, and the nematic liquid crystal molecules may be twisted in a thickness direction of the film.

The layer adapted to change a vibration direction of polarized light may be provided both in the right-eye shutter and the left-eye shutter. Such a configuration is suitable to a configuration in which left-side and right-side viewing angles of the shutters are larger than upper and lower viewing angles.

The layer adapted to change a vibration direction of polarized light may be provided in either one of the right-eye shutter and the left-eye shutter. Such a configuration is suitable to a configuration in which viewing angle characteristics of the left and the right shutters are substantially symmetric.

The present invention also directs to a stereoscopic image projection system comprising the active shutter glasses of the present invention and a liquid crystal display device.

The configuration of the stereoscopic image projection system of the present invention is not especially limited by other components as long as it essentially includes the above-mentioned components.

Advantageous Effects of Invention

In the active shutter glasses and the stereoscopic image projection system of the present invention, orientations of components of the shutters can be freely determined.

BRIEF DESCRIPTION OF DRAWINGS

FIG. 1 is a schematic perspective view showing the configuration of a stereoscopic image projection system of Embodiment 1.

FIG. 2 is a view describing operating principle of the stereoscopic image projection system of Embodiment 1.

FIG. 3 is a schematic perspective view showing the configuration of the stereoscopic image projection system of Embodiment 1.

FIG. 4 is a schematic view showing arrangement of axes in a video display device of Embodiment 1.

FIG. 5 is a schematic perspective view of the video display device of Embodiment 1 and polarizing sunglasses.

FIG. 6 is a schematic perspective view showing the configuration of active shutter glasses of Embodiment 1.

FIG. 7 shows viewing angle characteristics (CR ratio) of the active shutter glasses of Embodiment 1.

FIG. 8 is a schematic plan view showing the configuration of the video display device of Embodiment 1.

FIG. 9 is a graph showing relations between a viewing distance and a viewing angle.

FIG. 10 is a schematic view describing a human effective visual field.

FIG. 11 is a schematic view showing arrangement of axes of the stereoscopic image projection system of Embodiment 1.

FIG. 12 shows viewing angle characteristics (CR ratio) of the active shutter glasses of Embodiment 1 (Variation 1).

FIG. 13 is a schematic perspective view showing a configuration of a stereoscopic image projection system of Embodiment 1 (Variation 1).

FIG. 14 is a schematic perspective view showing a configuration of the active shutter glasses of Embodiment 1 (Variation 1).

FIG. 15 is a schematic view showing arrangement of axes of the stereoscopic image projection system of Embodiment 1 (Variation 1).

FIG. 16 is a schematic perspective view showing a configuration of a stereoscopic image projection system of Embodiment 2.

FIG. 17 is a schematic perspective view showing a configuration of active shutter glasses of Embodiment 2.

[FIG. 17]

[FIG. 18]

[FIG. 19]

[FIG. 20]

[FIG. 21]

[FIG. 22]

[FIG. 23]

[FIG. 24]

[FIG. 25]

DESCRIPTION OF EMBODIMENTS

In the present description, regarding "inner side" and "outer side" of glasses, the observer (user) side of the glasses worn by the observer is defined as "inner side" and the opposite side thereof is defined as "outer side".

Regarding "front" and "back" of a video display device, the observer side is defined as "front" and the opposite side thereof is defined as "back".

In the present description, regarding azimuths of the glasses, the right direction (3 o'clock direction) of the glasses seen from an observer wearing the glasses is defined to be 0° azimuth and the counter-clockwise direction is defined to be positive. Regarding azimuths of the display device, the right direction (3 o'clock direction) when a screen is seen from the front by an observer is defined to be 0° azimuth and the counter-clockwise direction is defined to be positive. Furthermore, regarding azimuths of both the glasses and the display device, the direction along 0° azimuth and 180° azimuth is also referred to as a "transvers direction" and the direction along 90° azimuth and 270° azimuth is also referred to as a "longitudinal direction".

A linear polarizing element has a function of converting natural light into linearly polarized light, and unless otherwise noted, the "linear polarizing element" herein includes only an element having a polarizing function but does not include a protective film.

In the present description, a λ/2 plate herein is a layer that retards at least light with a wavelength of 550 nm by substantially half the wavelength. The retardation produced by the λ/2 plate is precisely 275 nm with respect to light with a wavelength of 550 nm. It may be 220 nm or more and 320 nm or less, preferably 240 nm or more and 300 nm or less, and more preferably 260 nm or more and 280 nm or less.

An in-plane phase difference R (unit: nm) is defined by R=|nx−ny|×d when principal refractive indexes in the in-plane direction of a birefringent layer (including a liquid crystal cell, a λ/4 plate, and a λ/2 plate) are defined as nx and ny, a principal refractive index in the out-of-plane direction (thickness direction) is defined as nz, and the thickness of the birefringent layer is defined as d. A thickness direction phase difference Rth is an out-of-plane (thickness direction) phase difference (unit: nm) defined by Rth=(nz−(nx+ny)/2)×d. Unless otherwise noted, in the present specification, measurement wavelength of a phase difference is 550 nm.

Here, nx is a refractive index of the birefringent layer in a direction (that is, a slow axis direction) where an in-plane refractive index of the birefringent layer reaches a maximum and ny is a refractive index in a direction perpendicular to the slow axis (nx) in the plane.

Figure 24:
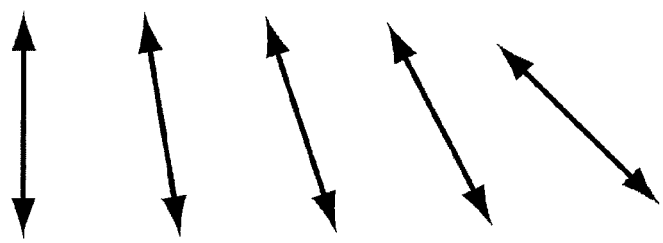
FIG. 24 is a schematic view describing functions of an azimuthal polarizer in accordance with the present invention.
Figure 25:
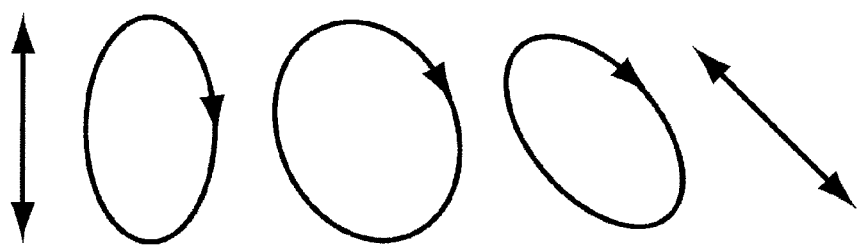
FIG. 25 is a schematic view describing functions of an azimuthal polarizer in accordance with the present invention.

A layer adapted to change a vibration direction of polarized light herein is also referred to as an azimuthal polarizer, and the azimuthal polarizer preferably changes a vibration direction of linearly polarized light. A method of changing a vibration direction of polarized light by the azimuthal polarizer is not particularly limited. For example, the azimuthal polarizer may change only a vibration direction without changing polarization or may change a vibration direction with changing polarization. More specifically, the azimuthal polarizer may change a vibration direction of linearly polarized light with maintaining polarization of the light as shown in FIG. 24. Further, as shown in FIG. 25, the azimuthal polarizer may show birefringence, and the phase difference due to the birefringence may change a vibration direction of linearly polarized light. In this case, the linearly polarized light is converted into elliptically polarized light and then converted back into linearly polarized light, whereby the change of the vibration direction is completed.

The present invention will be mentioned in more detail referring to the drawings in the following embodiments, but is not limited to these embodiments.

Embodiment 1

Figure 1:
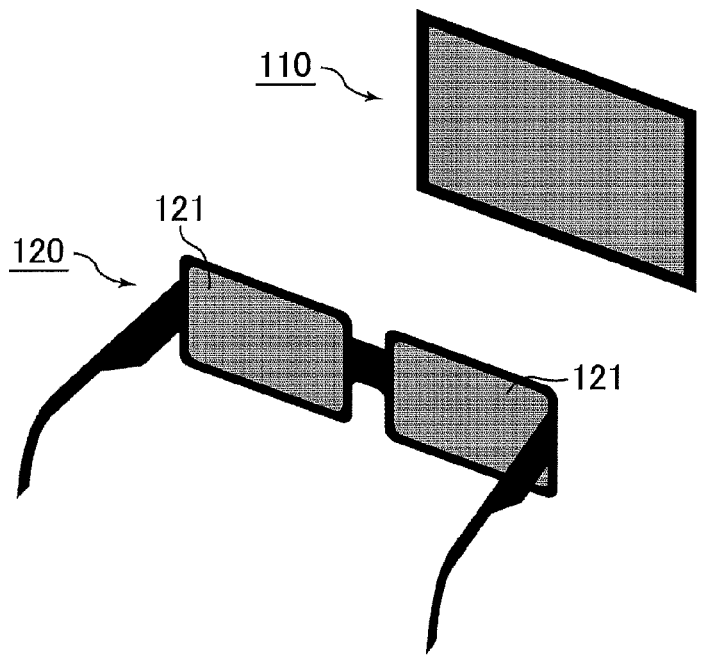
[FIG. 1]

As shown in FIG. 1, an active system stereoscopic image projection system of the present embodiment includes a video display device (3D display device) 110 and active shutter glasses 120.

Figure 2:
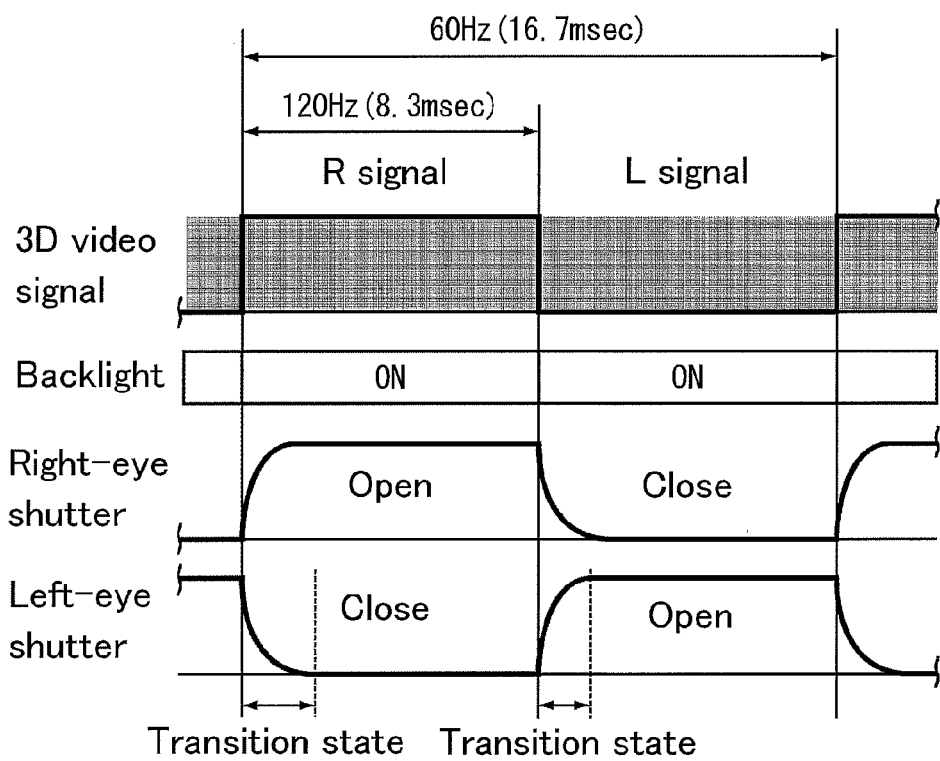
[FIG. 2]

As shown in FIG. 2, a video signal for right eye (R signal) and a video signal for left eye (L signal) are alternately supplied to the display device 110, and an image for right eye and an image for left eye with parallax are alternately displayed on a screen of the display device 110 on a time-division basis.

Figure 3:
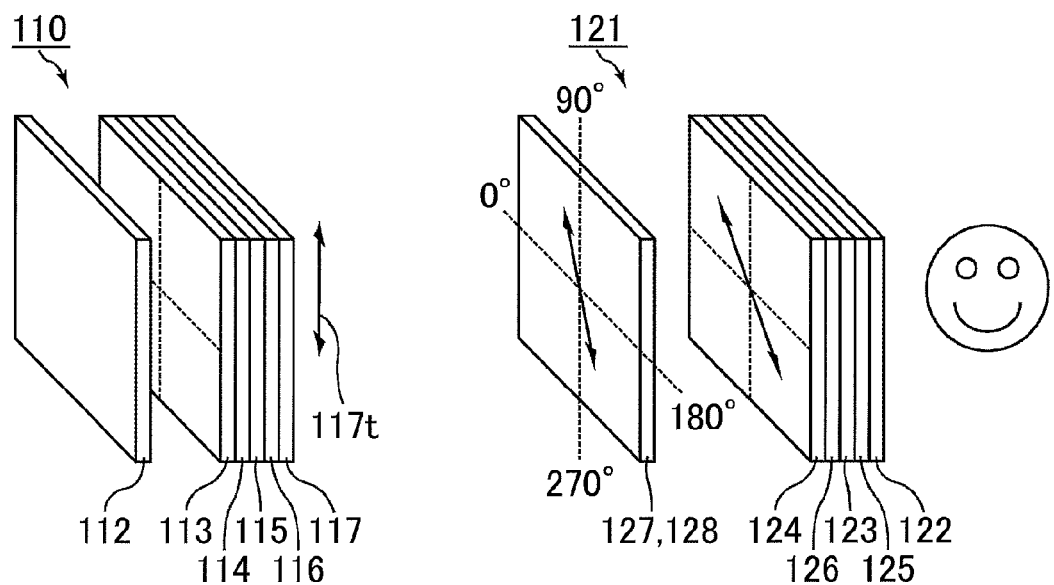
[FIG. 3]

The display device 110 is a transmission liquid crystal display device and includes, as shown in FIG. 3, the components, arranged in the following order from the back face of the device 110, of a backlight 112, a linear polarizing element (back polarizer) 113, a viewing angle compensation film 114, a liquid crystal cell 115, a viewing angle compensation film 116, and a linear polarizing element (front polarizer) 117. The backlight 112 may always be turned on.

Figure 4:
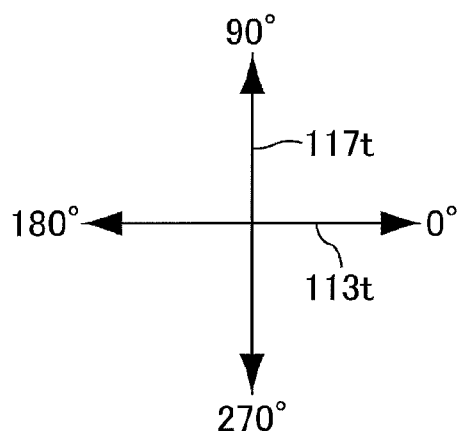
[FIG. 4]

As shown in FIG. 4, the polarizing elements 113 and 117 are arranged to constitute crossed nicols. That is, the angle between a transmission axis 113t of the back polarizer 113 and a transmission axis 117t of the front polarizer 117 is set to about 90°. However, the arrangement between the transmission axes of the back polarizer 113 and the front polarizer 117 can be appropriately set according to the mode of the liquid crystal cell 115, and the polarizers may be arranged to constitute parallel nicols.

Examples of the liquid crystal cell 115 include, but are not particularly limited to, liquid crystal cells having display modes such as a vertical alignment (VA) mode, an in-plane switching (IPS) mode, and a field fringe switching (FFS) mode. The liquid crystal cell 115 includes two transparent substrates, a liquid crystal layer disposed between the substrates, and a transparent electrode formed on at least one of the substrates. Examples of a driving system of the liquid crystal cell 115 include, but are not particularly limited to, a passive-matrix system and a plasma address system. An active matrix system is preferred.

Recent liquid crystal display devices for televisions commonly employ a VA mode or an IPS mode, and many of the devices are designed so that a transmission axis of a linear polarizing element disposed closer to an observer than a liquid crystal cell is oriented in a longitudinal direction. Also in the present embodiment, the transmission axis 117t of the front polarizer 117 is oriented in a longitudinal direction. Thereby, an observer can view the screen through polarizing sunglasses with no decrease in brightness without specially forming an additional member.

Figure 5:
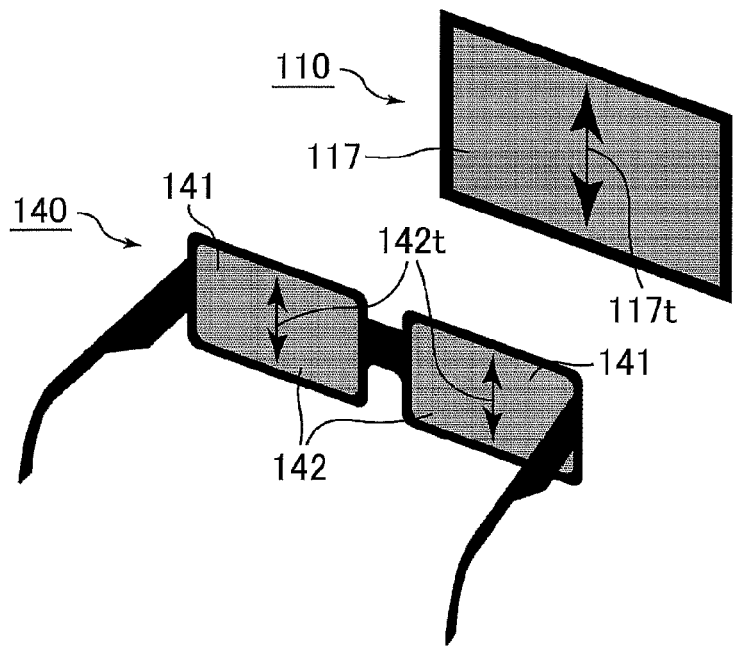
[FIG. 5]

Polarizing sunglasses are generally designed so as to absorb a polarization component vibrating in the horizontal direction and allow a polarization component vibrating in the vertical direction to pass through. This is because reflected light intensity of an S wave (polarized light vibrating perpendicularly to a plane of incidence) is great because of the Fresnel effect, and light emitted from a light source (sunlight, a fluorescent lamp, and the like) and reflected from a horizontal plane such as a floor, a desk, and a water surface mostly vibrates in the horizontal direction. Accordingly, as shown in FIG. 5, a linear polarizing element 142 is formed in each of left and right light transmitting portions 141 of polarizing sunglasses 140. A transmission axis 142t of the linear polarizing element 142 of the polarizing sunglasses 140 worn by an observer is generally oriented in the longitudinal direction. As a result, the observer can view the screen of the display device 110 in which the transmission axis 117t of the linear polarizing element 117 is designed to be oriented in the longitudinal direction, through the polarizing sunglasses 140 with no decrease in brightness.

The glasses 120 include a right-eye shutter and a left-eye shutter (hereinafter, also referred to as left and right shutters) 121, as shown in FIG. 1. The left and right shutters 121 alternately open to allow light to pass through the shutter opened. The shutter closed blocks light. As shown in FIG. 2, timing of the transmission and blocking is synchronized with an R signal and an L signal. Thereby, the image for right eye is projected to be seen by observer's right eye, and the image for left eye is projected to be seen by observer's left eye. Thus, the observer can recognize a stereoscopic vision.

Figure 6:
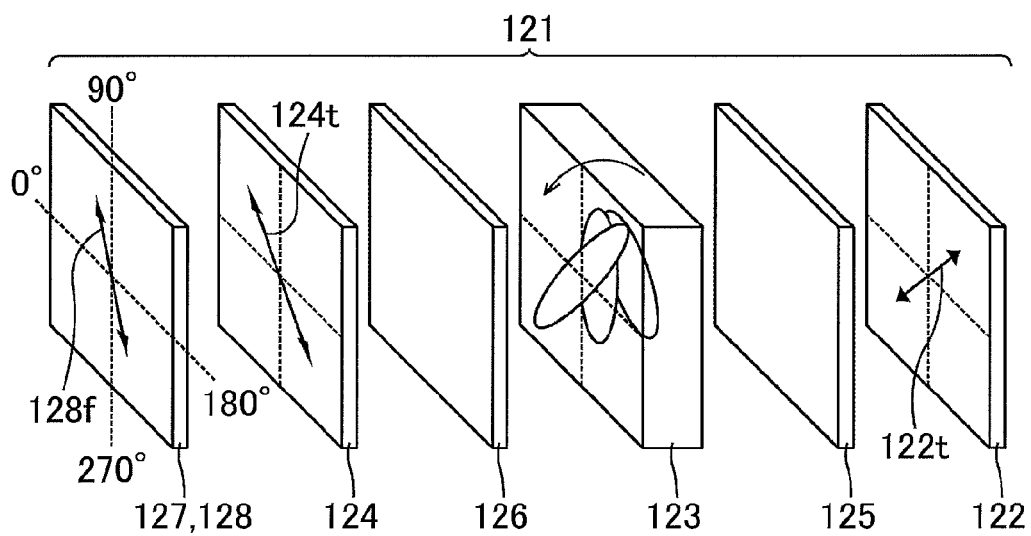
[FIG. 6]

As shown in FIGS. 3 and 6, the left and right shutters 121 each include components, arranged in the following order from the inner side, of a linear polarizing element (inner polarizing element) 122, a viewing angle compensation film 125, a cell 123 provided with a liquid crystal layer, a viewing angle compensation film 126, a linear polarizing element (outer polarizing element) 124, and a λ/2 plate 128 that is an azimuthal polarizer 127.

The polarizing elements 122 and 124 are generally arranged to constitute crossed nicols, but may be arranged to constitute parallel nicols. More specifically, the angle between a transmission axis 122t of the inner polarizing element 122 and a transmission axis 124t of the outer polarizing element 124 is set in the range of 90°±15° (suitably 90°±5°). The transmission axis 122t of the inner polarizing element 122 is oriented in the range of the direction along 135° azimuth±15° (suitably ±5°) and 315° azimuth±15° (suitably ±5°). The transmission axis 124t of the outer polarizing element 124 is oriented in the range of the direction along 45° azimuth±15° (suitably ±5°) and 225° azimuth±15° (suitably ±5°). These numerical value ranges include boundary values.

The viewing angle compensation films 125 and 126 compensate a viewing angle when the left and right shutters 121 block light. Examples of the films include a negative C plate. A refractive index ellipsoid of the negative C plate has a disc-like shape, and the negative C plate satisfies the relation nx≈ny>nz.

A liquid crystal mode of the cell 123 is a twisted nematic (TN) mode. The cell 123 includes two transparent substrates, a liquid crystal layer disposed between the substrates, and two transparent electrodes formed in the respective substrates. The liquid crystal layer includes nematic liquid crystal molecules with positive dielectric anisotropy. The liquid crystal molecules align in an aligning treatment direction (for example, a rubbing direction) on the substrate surface, and are aligned so as to be twisted about 90° in the thickness direction of the liquid crystal layer. The liquid crystal molecules are twisted in a counter-clockwise direction when viewed from the outer side (along the traveling direction of light). The aligning treatment direction of the outer substrate is substantially perpendicular to the transmission axis 124t of the outer polarizing element 124, and the aligning treatment direction of the inner substrate is substantially perpendicular to the transmission axis 122t of the inner polarizing element 122. More specifically, the angle between the aligning treatment direction of the outer substrate and the transmission axis 124t of the outer polarizing element 124 is set in the range of 90°±15° (suitably 90°±5°), and the angle between the aligning treatment direction of the inner substrate and the transmission axis 122t of the inner polarizing element 122 is set in the range of 90°±15° (suitably 90°±5°). These numerical value ranges include boundary values.

The liquid crystal cell 123 is not particularly limited as long as it can secure a level of response speed that allows synchronization with the frame rate of the display device 110. Examples of a liquid crystal mode of the cell 123 may include a super twisted nematic (STN) mode, an optically compensated birefringence (OCB) mode, a VA mode, and an IPS mode, in addition to a TN mode.

Figure 7:
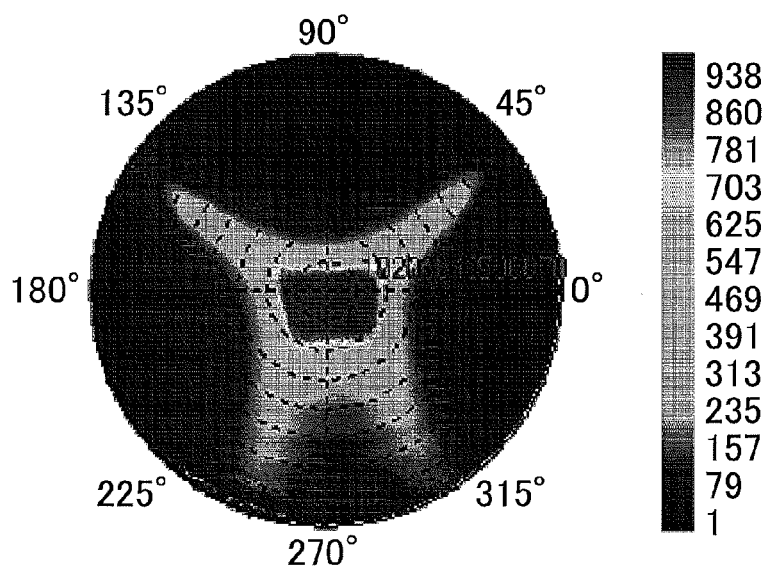
[FIG. 7]

Generally, active shutter glasses including liquid crystals have up-down asymmetric and left-right asymmetric viewing angle characteristics due to the asymmetry of alignment of liquid crystals. The left and right shutters 121 of the present embodiment also have up-down asymmetric and left-right asymmetric viewing angle characteristics (CR characteristics) as shown, for example, in FIG. 7. In the present embodiment, left-side and right-side viewing angles of the left and right shutters 121 of the glasses 120 worn by an observer are larger than upper and lower viewing angles thereof. In other words, the left-side viewing angle of the right-eye shutter is larger than either the upper or lower viewing angle of the right-eye shutter, and the right-side viewing angle of the right-eye shutter is larger than either the upper or lower viewing angle of the right-eye shutter. The left-side viewing angle of the left-eye shutter is larger than either the upper or lower viewing angle of the left-eye shutter, and the right-side viewing angle of the left-eye shutter is larger than either the upper or lower viewing angle of the left-eye shutter. Thereby, if the display device 110 has a landscape-oriented screen such as television screens and theater screens, stereoscopic vision with excellent display quality can be viewed particular in the left and right areas of the screen.

Figure 8:
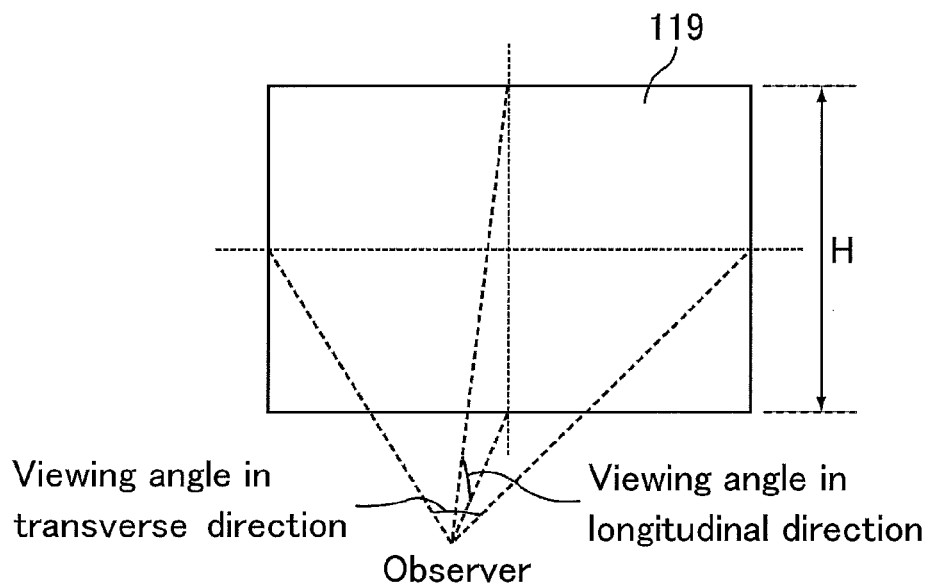
[FIG. 8]
Figure 9:
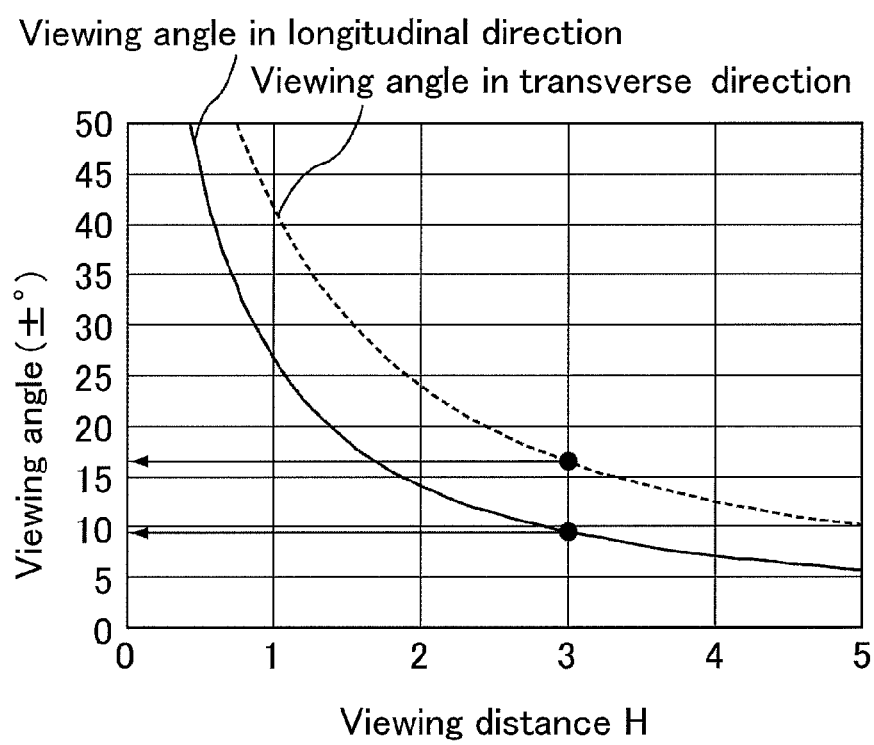
[FIG. 9]

For example, as shown in FIG. 8, if an observer located at a line normal to the center of the screen views a full Hi-Vision TV from a viewing distance of 3H (H is the longitudinal length of the screen 119), a viewing angle of the observer (a range viewed by the observer) is ±17° in the transverse direction and ±10° in the longitudinal direction, as shown in FIG. 9. An image for right eye and an image for left eye are generally displayed in a landscape-oriented screen like in theater screens and super Hi-Vision TVs as well as full Hi-Vision TVs. Therefore, the viewing angle of the glasses 120 is preferably larger in the transverse direction than in the longitudinal direction, and a sufficiently high CR ratio is preferably achieved within the range of the viewing angle of an observer (the range observed by an observer).

Figure 10:
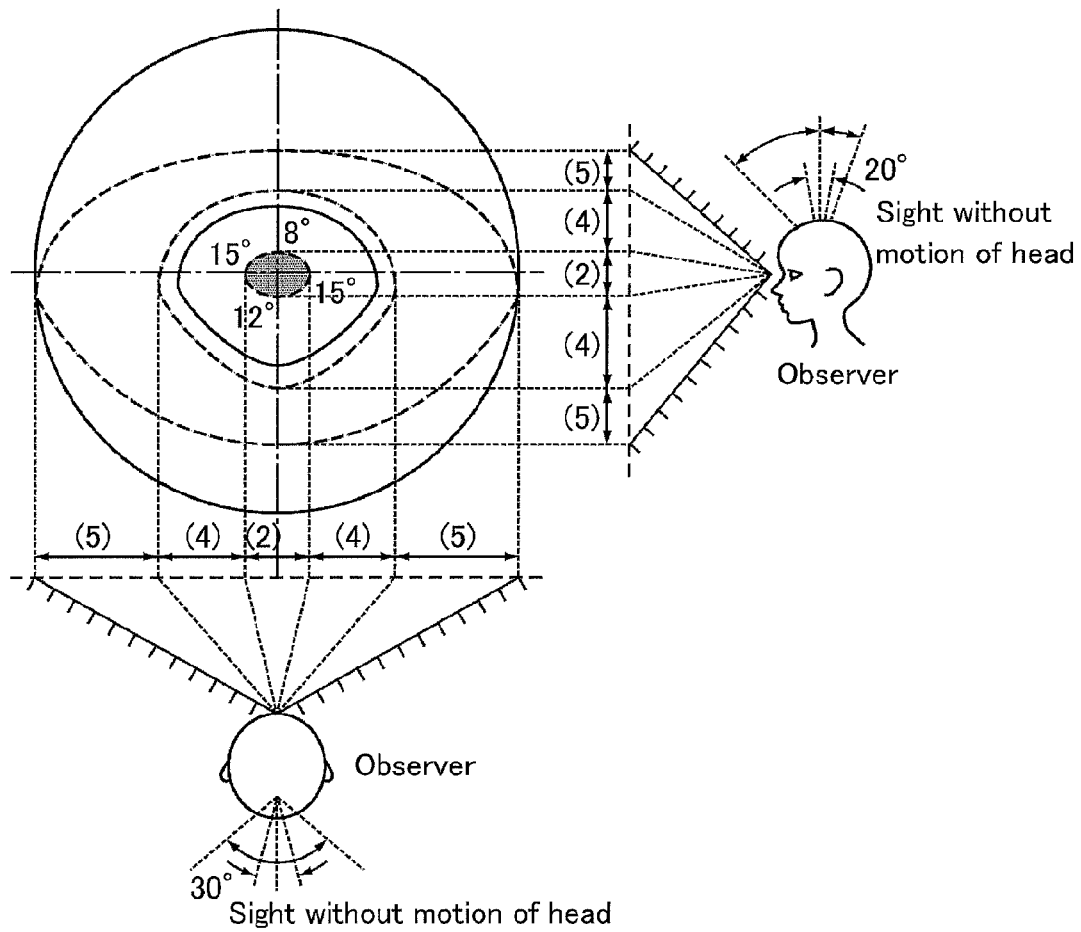
[FIG. 10]

Non Patent Literature 1 discloses that a human effective visual field is in a range (2) described in FIG. 10 (information in the range is capable of being momentary received by an observer and the range is capable of being viewed only by eye motion). Specifically, the effective visual field is within 15° on each of the left and right sides, 8° on the upper side, and 12° on the lower side. That is, the effective visual field in the transverse direction is the largest, followed by the downward direction, and then the upward direction.

Accordingly, the viewing angle characteristics of the glasses 120 are preferably determined by reference to the range of the effective visual field, and an area with a large viewing angle of the glasses 120 is preferably arranged on the right side and the left side. An area with a small viewing angle of the glasses 120 may be arranged on the upper side.

However, as described above, the orientation of the conventional active shutter glasses cannot be freely determined because the direction of the transmission axis of the outer polarizing element thereof is restricted. The brightness of the screen is reduced with an increase in angle between the transmission axis of the front polarizer and the transmission axis of the outer polarizing element. In the present embodiment, the angle between the transmission axis 124t of the outer polarizing element 124 and the transmission axis 117t of the front polarizer 117 is about 45°, which may cause a decrease in brightness of the screen.

For this reason, in the present embodiment, a λ/2 plate 128 is formed at the outer side of each of the outer polarizing elements 124 of the left and right shutters 121. The λ/2 plate 128 appropriately rotates the vibration direction (polarization) of linearly polarized light coming from the front polarizer 117, whereby the vibration direction of the obtained polarized light coming from the λ/2 plate 128 can be oriented in the same direction as the transmission axis 124t of the outer polarizing element 124. That is, the polarized light emitted from the λ/2 plate 128 can effectively pass through the glasses 120.

Thus, in the present embodiment, the orientations of the components of the left and right shutters 121 can be freely determined so that the above-described viewing angle characteristics are exhibited and a decrease in brightness can be suppressed. Therefore, light leakage, tint variation, a reduction in contrast (CR) ratio, generation of crosstalk, and the like can be suppressed particularly in the left and right areas of the screen with the suppression of a decrease in the brightness.

Figure 11:
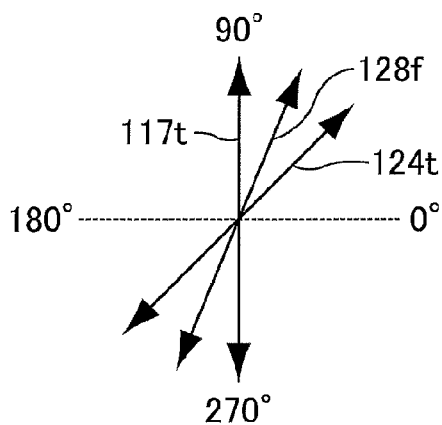
[FIG. 11]
Figure 12:
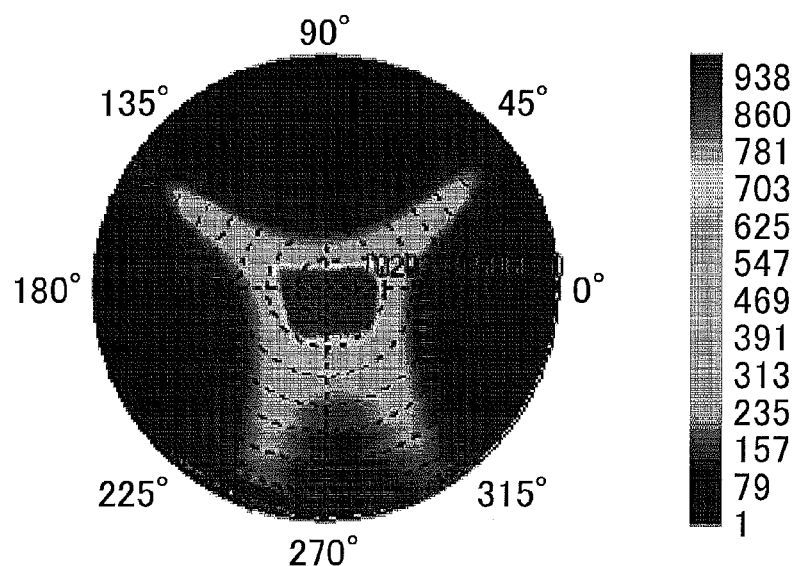
[FIG. 12]

As shown in FIG. 11, an in-plane fast axis 128f of the λ/2 plate 128 is oriented in the direction substantially bisecting the angle between the transmission axis 117t of the front polarizer 117 and the transmission axis 124t of the outer polarizing element 124, that is, in the direction along about 22.5° azimuth and about 202.5° azimuth. The in-plane fast axis 128f is preferably set in the range of an azimuth bisecting the angle between the transmission axis 117t and the transmission axis 124t±15°, more preferably ±10°, and still more preferably ±5°. These numerical value ranges include boundary values.

Figure 13:
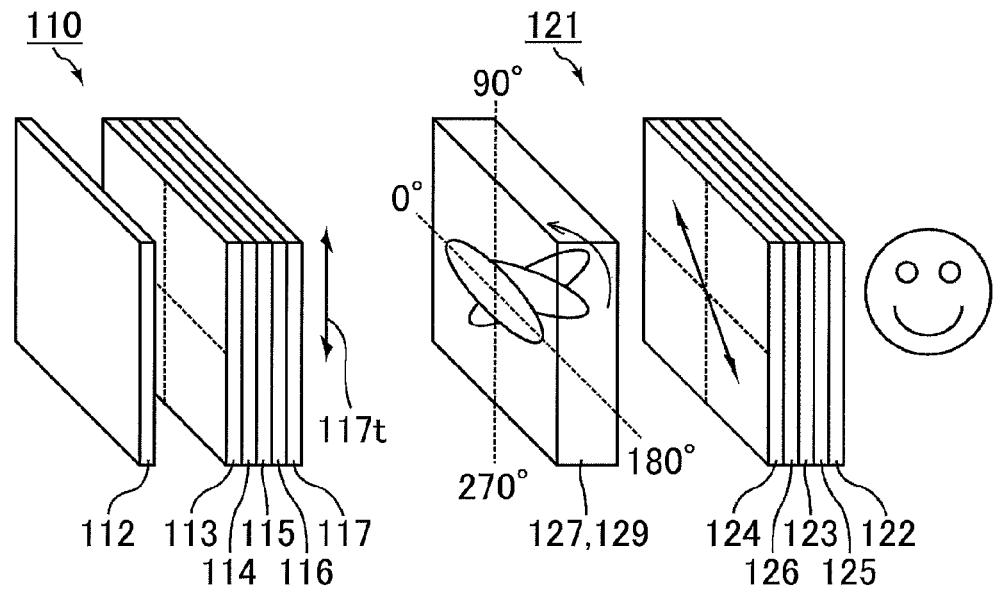
[FIG. 13]
Figure 14:
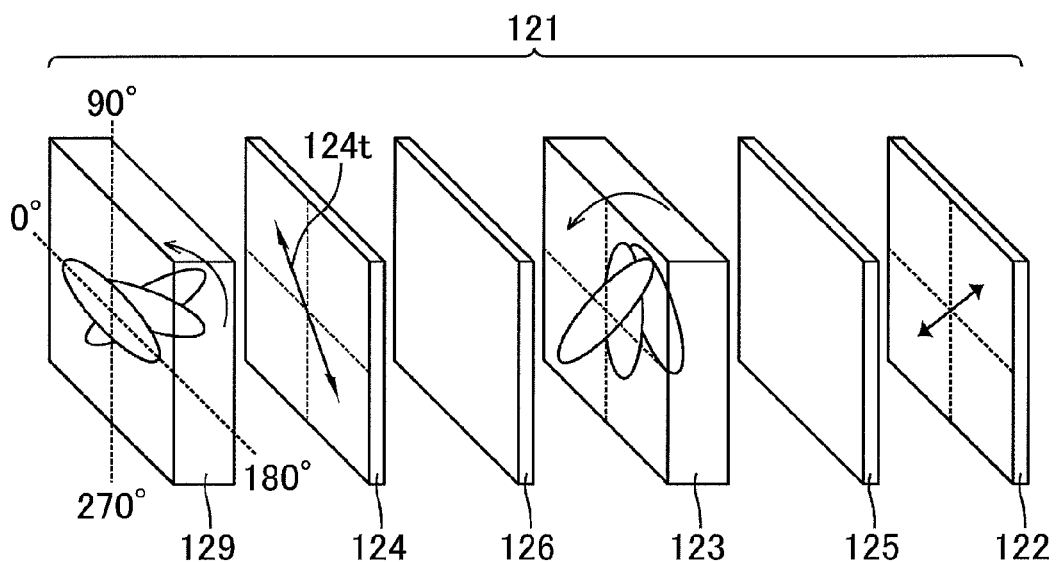
[FIG. 14]
Figure 15:
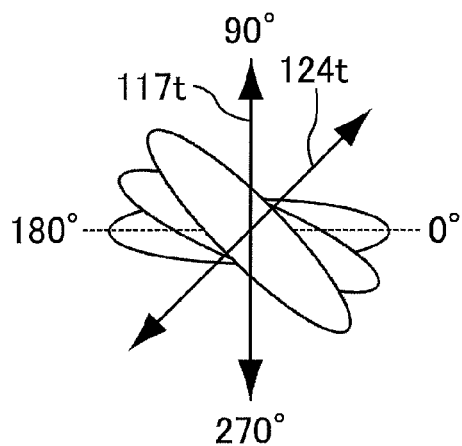
[FIG. 15]

Variation 1 of the present embodiment is described below. The left- and right-side viewing angles of the left and right shutters 121 of the present variation are larger than the upper-side and lower-side viewing angles of the shutters. However, in the present variation, glasses 120 have a liquid crystal film 129 instead of a λ/2 plate 128 as an azimuthal polarizer 127 as shown in FIGS. 13 and 14.

The liquid crystal film 129 includes nematic liquid crystal molecules. The liquid crystal molecules are aligned so as to be twisted about 45°, more specifically 30° to 60° (preferably 40° to 50°) in the thickness direction of the film 129. Further, the liquid crystal molecules are twisted in a counter-clockwise direction when viewed from the outer side (along the traveling direction of light). As shown in FIG. 14, the long axis of each liquid crystal molecule in the inner surface is substantially perpendicular to the transmission axis 124t of the outer polarizing element 124, and the long axis of each liquid crystal molecule in the outer surface is substantially perpendicular to the transmission axis 117t of the front polarizer 117. More specifically, the angle between the long axis of each liquid crystal molecule in the inner surface and the transmission axis 124t of the outer polarizing element 124 is set in the range of 90°±15° (suitably 90°±5°), and the angle between the long axis of each liquid crystal molecule in the outer surface and the transmission axis 117t of the front polarizing element 117 is set in the range of 90°±15° (suitably 90°±5°). These numerical value ranges include boundary values.

The liquid crystal film 129 appropriately rotates the vibration direction (polarization) of linearly polarized light coming from the front polarizer 117, whereby the vibration direction of the obtained polarized light emitted from the liquid crystal film 129 can be oriented in the same direction as the transmission axis 124t of the outer polarizing element 124. That is, the polarized light emitted from the liquid crystal film 129 can effectively pass through the glasses 120.

Thus, in the present variation, the orientations of the components of the left and right shutters 121 can be freely determined so that the above-described viewing angle characteristics are exhibited and a decrease in brightness can be suppressed. Therefore, light leakage, tint variation, a reduction in contrast (CR) ratio, generation of crosstalk, and the like can be suppressed particularly in the left and right areas of the screen with the suppression of a decrease in brightness.

In Embodiment 1 and Variation 1, the direction of the transmission axis 117t of the front polarizer 117 of the display device 110 is not particularly limited, and can be appropriately determined. For example, the transmission axis 117t may be arranged in the direction along 45° azimuth and 225° azimuth. Also in this case, the direction of the in-plane fast axis 128l of the λ/2 plate 128 or the orientation direction of the liquid crystal film 129 is appropriately adjusted, whereby an area with a large viewing angle of the glasses 120 is preferably arranged on the right side and the left side.

Embodiment 2

Figure 16:
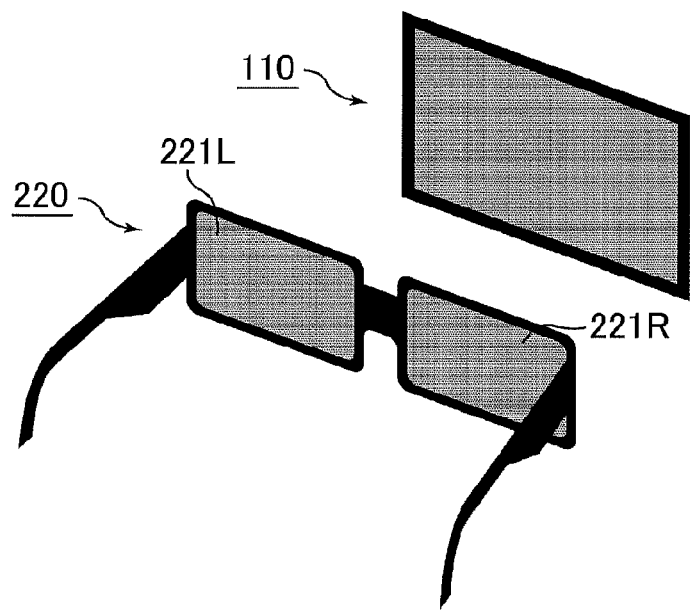
[FIG. 16]

An active system stereoscopic image projection system of the present embodiment includes the same video display device (3D display device) 110 as that in Embodiment 1 and active shutter glasses 220, as shown in FIG. 16. Only the configuration of active shutter glasses is different between the systems of the present embodiment and Embodiment 1. Therefore, details of components other than the active shutter glasses are omitted.

The glasses 220 have a right-eye shutter 221R and a left-eye shutter 221L. The shutters 221R and 221L alternately open to allow light to pass through the shutter opened. The shutter closed blocks light. As shown in FIG. 2, timing of the transmission and blocking is synchronized with an R signal and an L signal.

Figure 17:
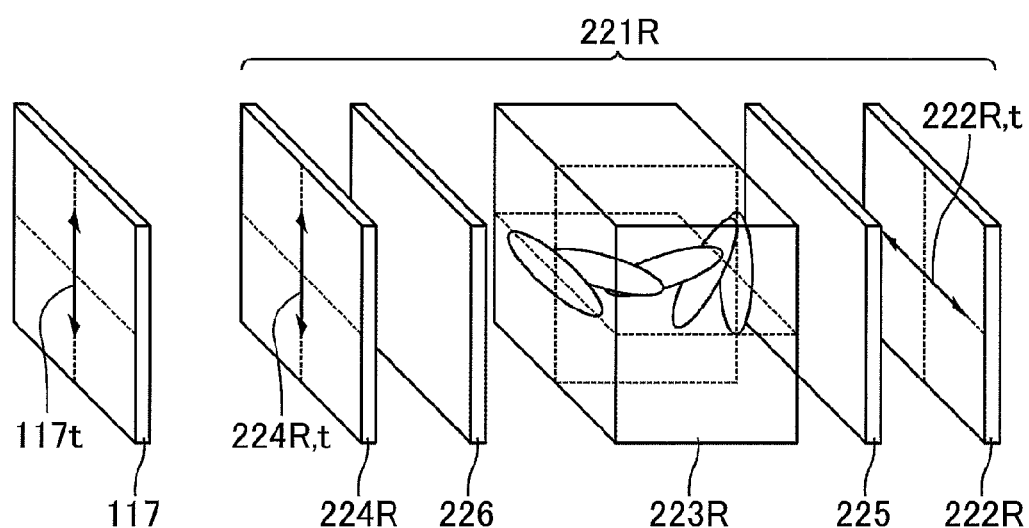
[FIG. 17]

As shown in FIG. 17, the shutter 221R includes components, arranged in the order from the inner side, of a linear polarizing element (inner polarizing element) 222R, a viewing angle compensation film 225, a cell 223R provided with a liquid crystal layer, a viewing angle compensation film 226, and a linear polarizing element (outer polarizing element) 224R.

Figure 18:
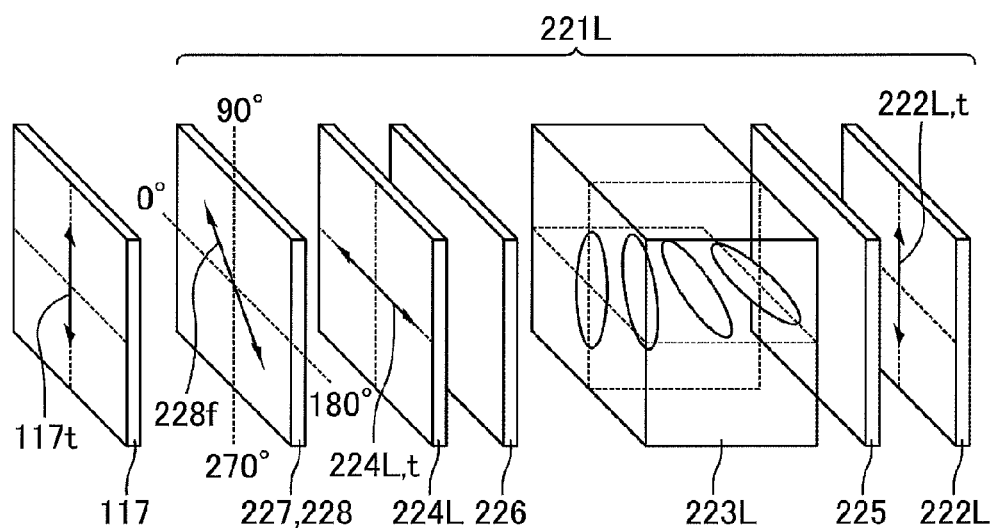
FIG. 18 is a schematic perspective view showing a configuration of the active shutter glasses of Embodiment 2.

As shown in FIG. 18, the shutter 221L includes components, arranged in the order from the inner side, of a linear polarizing element (inner polarizing element) 222L, a viewing angle compensation film 225, a cell 223L provided with a liquid crystal layer, a viewing angle compensation film 226, a linear polarizing element (outer polarizing element) 224L, and a λ/2 plate 228 that is an azimuthal polarizer 227.

The polarizing elements 222R and 224R are usually arranged to constitute crossed nicols, but may be arranged to constitute parallel nicols. More specifically, the angle between the transmission axis 222R,t of the inner polarizing element 222R and the transmission axis 224R,t of the outer polarizing element 224R is set in the range of 90°±15° (suitably 90°±5°). The transmission axis 222R,t of the inner polarizing element 222R is oriented in the range of the direction along 0° azimuth and 180° azimuth±15° (suitably ±5°). The transmission axis 224R,t of the outer polarizing element 224R is oriented in the range of the direction along 90° azimuth and 270° azimuth±15° (suitably ±5°). These numerical value ranges include boundary values.

A liquid crystal mode of the cell 223R is a twisted nematic (TN) mode. The cell 223R includes two transparent substrates, a liquid crystal layer disposed between the substrates, and two transparent electrodes formed in the respective substrates. The liquid crystal layer includes nematic liquid crystal molecules with positive dielectric anisotropy. The liquid crystal molecules align in an aligning treatment direction (for example, a rubbing direction) on the substrate surface, and are aligned so as to be twisted about 90° in the thickness direction of the liquid crystal layer. Further, the liquid crystal molecules are twisted in a counter-clockwise direction when viewed from the outer side (from a direction against the traveling direction of light). The aligning treatment direction of the outer substrate is substantially perpendicular to the transmission axis 224R,t of the outer polarizing element 224R, and the aligning treatment direction of the inner substrate is substantially perpendicular to the transmission axis 222R,t of the inner polarizing element 222R. More specifically, the angle between the aligning treatment direction of the outer substrate and the transmission axis 224R,t of the outer polarizing element 224R is set in the range of 90°±15° (suitably 90°±5°), and the angle between the aligning treatment direction of the inner substrate and the transmission axis 222R,t of the inner polarizing element 222R is set in the range of 90°±15° (suitably 90°±5°). These numerical value ranges include boundary values.

The polarizing elements 222L and 224L are usually arranged to constitute crossed nicols, but may be arranged to constitute parallel nicols. More specifically, the angle between the transmission axis 222L,t of the inner polarizing element 222L and the transmission axis 224L,t of the outer polarizing element 224L is set in the range of 90°±15° (suitably 90°±5°). The transmission axis 222L,t of the inner polarizing element 222L is oriented in the range of the direction along 90° azimuth and 270° azimuth±15° (suitably ±5°). The transmission axis 224L,t of the outer polarizing element 224L is oriented in the range of the direction along 0° azimuth and 180° azimuth±15° (suitably ±5°). These numerical value ranges include boundary values.

A liquid crystal mode of the cell 223L is a twisted nematic (TN) mode. The cell 223L includes two transparent substrates, a liquid crystal layer disposed between the substrates, and two transparent electrodes formed in the respective substrates. The liquid crystal layer includes nematic liquid crystal molecules with positive dielectric anisotropy. The liquid crystal molecules align in an aligning treatment direction (for example, a rubbing direction) on the substrate surface, and are aligned so as to be twisted about 90° in the thickness direction of the liquid crystal layer. The liquid crystal molecules are twisted in a clockwise direction when viewed from the outer side (along the traveling direction of light). The aligning treatment direction of the outer substrate is substantially perpendicular to the transmission axis 224L,t of the outer polarizing element 224L, and the aligning treatment direction of the inner substrate is substantially perpendicular to the transmission axis 222L,t of the inner polarizing element 222L. More specifically, the angle between the aligning treatment direction of the outer substrate and the transmission axis 224L,t of the outer polarizing element 224L is set in the range of 90°±15° (suitably 90°±5°), and the angle between the aligning treatment direction of the inner substrate and the transmission axis 222L,t of the inner polarizing element 222L is set in the range of 90°±15° (suitably 90°±5°). These numerical value ranges include boundary values.

The cells 223R and 223L are not particularly limited as long as they can secure a level of response speed that allows synchronization with the frame rate of the display device 110. Examples of the liquid crystal mode of the cells 223R and 223L may include a STN mode, an OCB mode, a VA mode, and an IPS mode, in addition to a TN mode.

Viewing angle compensation films 225 and 226 compensate a viewing angle when the shutters 221R and 221L block light. Examples of the films include a negative C plate.

Figure 19:
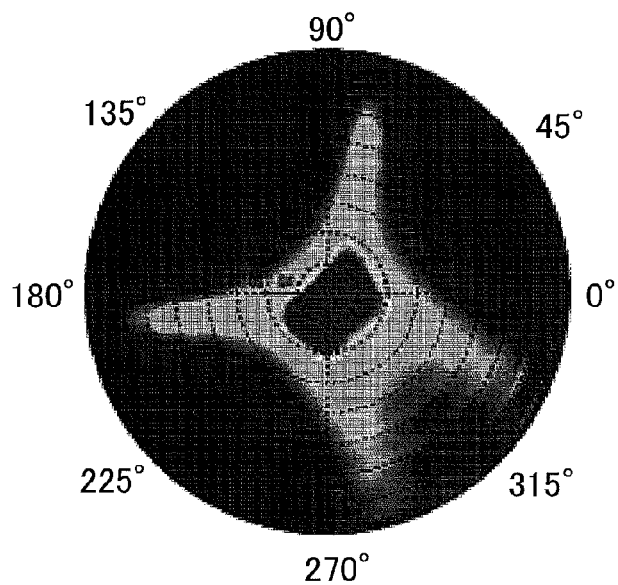
FIG. 19 shows viewing angle characteristics (CR ratio) of the active shutter glasses of Embodiment 2.
Figure 20:
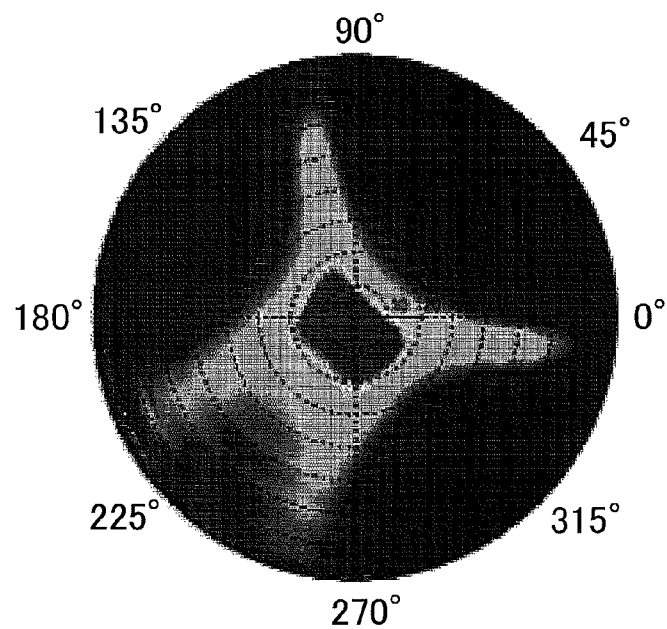
FIG. 20 shows viewing angle characteristics (CR ratio) of the active shutter glasses of Embodiment 2.

Generally, active shutter glasses including liquid crystals have up-down asymmetric and left-right asymmetric viewing angle characteristics because of asymmetry of alignment of liquid crystals. Also in the present embodiment, the shutter 221R has, for example as shown in FIG. 19, up-down asymmetric and left-right asymmetric viewing angle characteristics (CR characteristics), and the shutter 221L has, for example as shown in FIG. 20, up-down asymmetric and left-right asymmetric viewing angle characteristics (CR characteristics).

Figure 21:
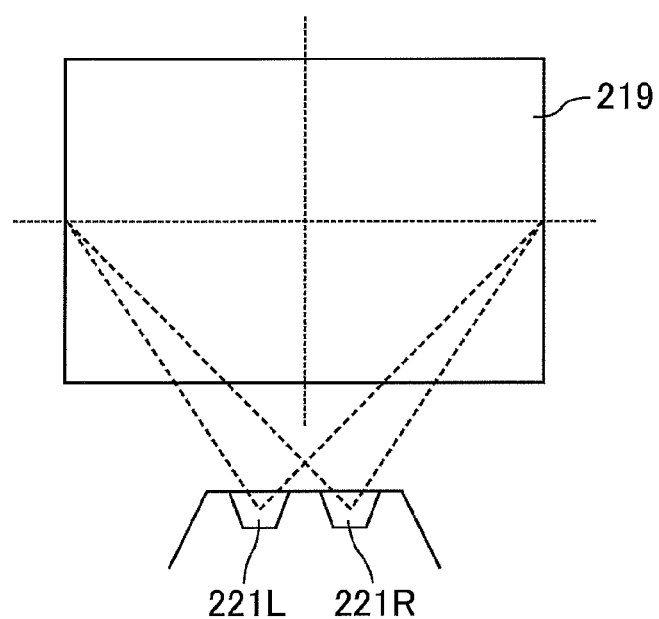
FIG. 21 is a schematic plan view showing a configuration of a video display device of Embodiment 2.
Figure 22:
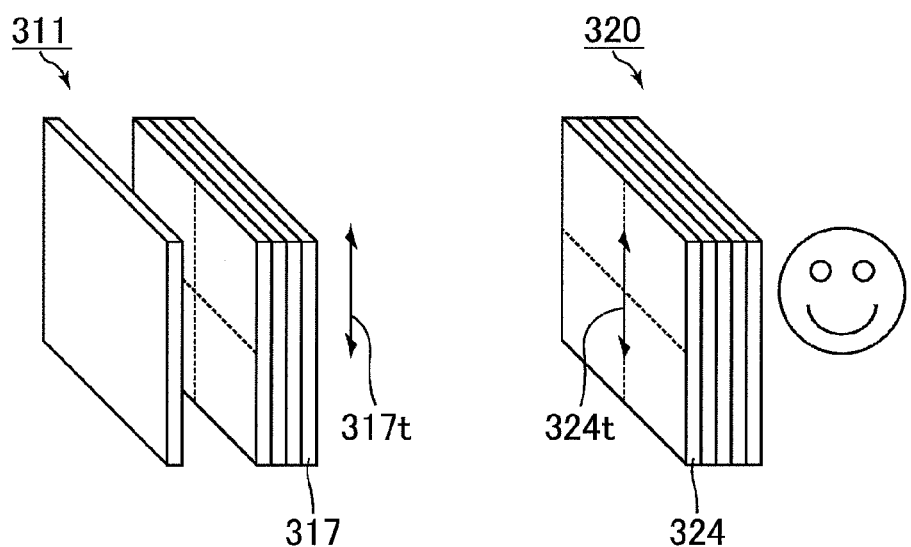
FIG. 22 is a schematic perspective view showing a configuration of a conventional stereoscopic image projection system.
Figure 23:
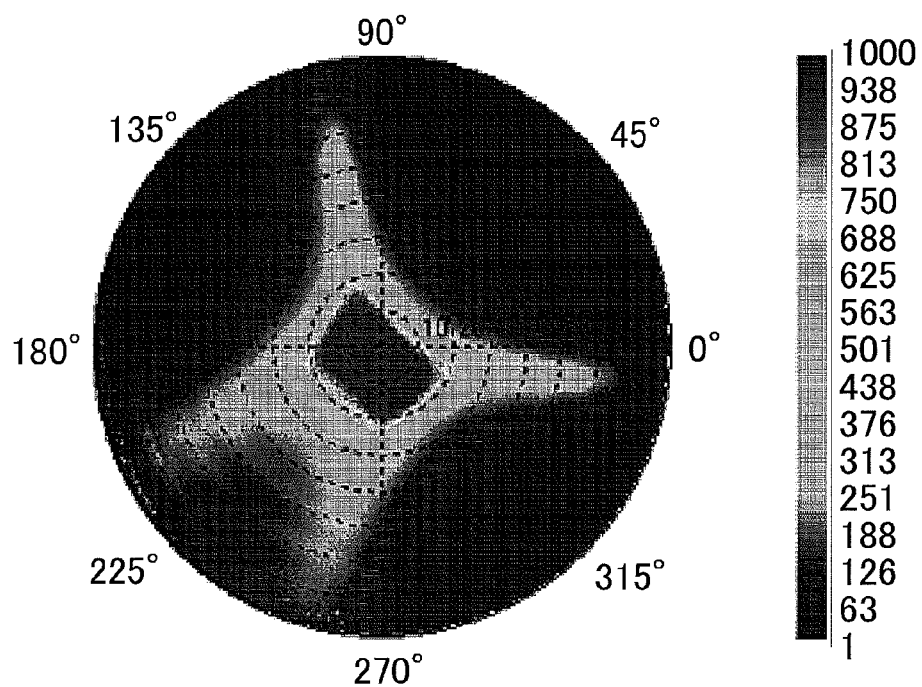
FIG. 23 shows viewing angle characteristics (CR ratio) of conventional active shutter glasses.

The display device 110 is generally provided with a landscape-oriented screen 219 like screens of televisions and theater screens as shown in FIG. 21. If an observer views a stereoscopic vision from the front, the shutters 221R and 221L need to have wide and symmetric viewing angle characteristics.

In the present embodiment, the left-side and right-side viewing angles of each of the shutters 221R and 221L of the glasses 220 worn by an observer are larger than the upper and lower viewing angles of these. Furthermore, the viewing angle characteristics of the shutters 221R and 221L are substantially symmetrical to each other. That is, the shutters 221R and 221L are arranged so that viewing angle characteristics of these become symmetrical to each other. Therefore, viewing angle characteristics needed in the case that an observer views a stereoscopic vision from the front can be achieved in the present embodiment.

However, as described above, the orientations of the conventional active shutter glasses cannot be freely determined because the direction of the transmission axis of the outer polarizing element thereof is restricted. The brightness of the screen is reduced with an increase in angle between the transmission axis of the front polarizer and the transmission axis of the outer polarizing element. In the present embodiment, the angle between the transmission axis 124t of the outer polarizing element 224L and the transmission axis 117t of the front polarizer 117 is about 90°, whereby the left visual field of an observer becomes almost dark.

For this reason, in the present embodiment, a λ/2 plate 228 is formed at the outer side of the outer polarizing element 224L of the shutter 221L. The λ/2 plate 228 appropriately rotates the vibration direction (polarization) of linearly polarized light coming from the front polarizer 117, whereby the vibrating direction of the resulting polarized light passing through the λ/2 plate 228 can be oriented in the same direction as the transmission axis 224L,t of the outer polarizing element 224L. That is, the polarized light emitted from the λ/2 plate 228 can effectively pass through the shutter 221L.

Thus, in the present embodiment, the orientations of the components of the left and right shutters 121 can be freely determined so that the above-described viewing angle characteristics are exhibited and a decrease in brightness can be suppressed. Therefore, light leakage, tint variation, a reduction in the contrast ratio (CR), generation of crosstalk, and the like can be suppressed particularly in the left and right areas of the screen with the suppression of a decrease in brightness.

An in-plane fast axis 228f of the λ/2 plate 228 is oriented in the direction substantially bisecting the angle between the transmission axis 117t of the front polarizer 117 and the transmission axis 224L,t of the outer polarizing element 224L, that is, the direction along about 45° azimuth and about 225° azimuth. The in-plane fast axis 228f is preferably oriented in the range of an azimuth bisecting the angle between the transmission axis 117t and the transmission axis 224L, t±15°, more preferably ±10°, and still more preferably ±5°. These numerical value ranges include boundary values.

Also in the present embodiment, a liquid crystal film may be formed instead of the λ/2 plate 228 as an azimuthal polarizer 227 in the same way as Variation 1 of Embodiment 1.

Components in Embodiments 1 and 2 are described in detail below.

Typical examples of the linear polarizing element include a polyvinyl alcohol (PVA) film on which an anisotropic material such as an iodine complex having a dichroic property is adsorbed and aligned. In order to secure mechanical strength and wet heat resistance, a protective film such as a triacetyl cellulose (TAC) film is usually laminated on the both sides of the PVA film. Such a resulting film is practically used.

The material of the birefringent layer such as a λ/2 plate is not particularly limited, and may be, for example, a stretched polymer film. Examples of the polymer include polycarbonate, polysulfone, polyether sulfone, polyethylene terephthalate, polyethylene, polyvinyl alcohol, norbornene, triacetyl cellulose, and diacetyl cellulose.

The method of forming the λ/2 plate is not particularly limited. The λ/2 plate is stacked on a linear polarizing element so that the slow axis of the λ/2 plate and the transmission axis of the linear polarizing element make a predetermined angle. Therefore, the λ/2 plate is preferably formed by stretching and aligning the film obliquely to the flowing direction of the roll film.

The method of forming the liquid crystal film is not particularly limited. The liquid crystal film may be formed, for example, by curing a UV curable liquid-crystalline resin. The UV curable resin contains a nematic liquid crystal material and a liquid-crystalline monomer.

The azimuthal polarizer is preferably adjacent to the linear polarizing element. In other words, a birefringent layer is not preferably provided between the azimuthal polarizer and the linear polarizing element. Thereby, the polarization of linearly polarized light can be easily converted into a desired polarization state. In this case, an isotropic film may be arranged between the azimuthal polarizer and the linear polarizing element. Even if a birefringent layer is provided between the azimuthal polarizer and the linear polarizing element, the birefringence function of the birefringent layer is substantially cancelled by setting the slow axis of the birefringent layer in the direction substantially in parallel with or substantially perpendicular to the transmission axis of the linear polarizing element. Therefore, the same effect as that in the case that the birefringent layer is not provided between the azimuthal polarizer and the linear polarizing element can be obtained.

The birefringent layer means an optically anisotropic layer in which either one of the absolute value of the in-plane phase difference R and the absolute value of the thickness direction phase difference Rth is 10 nm or more and preferably 20 nm or more.

Further, an isotropic film means a film in which both the absolute value of the in-plane phase difference R and the absolute value of the thickness direction phase difference Rth are 10 nm or less and preferably 5 nm or less.

According to Embodiments 1 and 2, stereoscopic vision excellent in display quality can be viewed with the suppression of decrease in brightness.

In Embodiments 1 and 2, the azimuthal polarizer is formed in the active shutter glasses. Thereby, the intended functions of the 3D display devices can be maintained when an observer views the device through the polarizing sunglasses. More specifically, in the 3D display devices (liquid crystal display devices) in accordance with Embodiments 1 and 2, the transmission axis of the front polarizer is oriented in the longitudinal direction so that an observer can view standard two-dimensional vision through polarizing sunglasses. Accordingly, if an azimuthal polarizer is attached to the display device, the direction of the polarized light coming from the display device is changed. As a result, an observer cannot view two-dimensional vision through the polarizing sunglasses.

The display devices according to Embodiments 1 and 2 can display two-dimensional vision as well as stereoscopic vision. In Embodiments 1 and 2, since the azimuthal polarizer is formed in the active shutter glasses, an observer can view two-dimensional vision displayed by a 3D display device through polarizing sunglasses with no trouble.

Further, since the azimuthal polarizer is formed in the active shutter glasses, an observer can view uniform and clear stereoscopic vision displayed by a 3D display device from any angle through the active shutter glasses. This is because the positional relationship between eyes of an observer and the azimuthal polarizer provided on the active shutter glasses is fixed.

In the technique disclosed in Patent Literature 2, a display device includes a half-wave plate. When a screen is viewed obliquely, a birefringent half-wave plate is also viewed obliquely. Characteristics of the birefringent half-wave plate viewed obliquely are changed depending on the observation angles. As a result, the half-wave plate cannot appropriately rotate polarized light. On the other hand, the azimuthal polarizer in accordance with Embodiments 1 and 2 always properly face eyes of an observer. Therefore, the above-described problem can be prevented.

Further, in accordance with Embodiments 1 and 2, the active shutter glasses can be prepared at low costs. Generally, an area of the azimuthal polarizer is larger when it is provided on the 3D display device than when it is provided on the active shutter glasses. Accordingly, it is easily understood that costs are increased when the azimuthal polarizer is provided on the 3D display device. Conversely, cost savings are achieved according to Embodiments 1 and 2.

The half-wave plate cannot be attached to polarizing glasses by the technique disclosed in Patent Literature 2. This is because polarizing glasses with a half-wave plate loses the intended function. Specifically, for example in the polarizing sunglasses, the absorption axis is oriented so as to absorb reflection light (transvers wave) as described above. However, if the half-wave plate is attached to such polarizing sunglasses, a polarization axis of the polarizing sunglasses is changed by 90°, whereby the polarizing sunglasses cannot absorb reflection light.

The present application claims priority to Patent Application No. 2010-90704 filed in Japan on Apr. 9, 2010 under the Paris Convention and provisions of national law in a designated State, the entire contents of which are hereby incorporated by reference.

REFERENCE SIGNS LIST

110: Video display device
112: Backlight
113, 117, 122, 124, 142, 222R, 222L, 224R, 224L, 317, 324: Linear polarizing element
114, 116, 125, 126, 225, 226: Viewing angle compensation film
115: Liquid crystal cell
123, 223R, 223L: Cell provided with liquid crystal layer
119, 219: Screen
120, 220, and 320: Active shutter glasses
121, 221R, 221L: Shutter
127, 227: Azimuthal polarizer
128, 228: λ/2 plate
129: Liquid crystal film
140: Polarizing sunglasses
141: Light transmitting portion
331: Liquid crystal display device

The invention claimed is:

1. Active shutter glasses for a stereoscopic image projection system, the active shutter glasses comprising:
a right-eye shutter; and
a left-eye shutter,
wherein the right-eye shutter and the left-eye shutter each include a liquid crystal layer and a linear polarizing element,
at least one of the right-eye shutter and the left-eye shutter includes a layer adopted to change a vibration direction of polarized light,
the linear polarizing element is provided at the outer side of the liquid crystal layer,
the layer adopted to change a vibration direction of polarized light is provided at the outer side of the linear polarizing element;
the layer adopted to change a vibration direction of polarized light changes a vibration direction of incoming polarized light into a direction parallel to a transmission axis of the linear polarizing element;
the layer adopted to change a vibration direction of polarized light is a λ/2 plate, and
an in-plane fast axis of the λ/2 plate is oriented in a direction substantially bisecting an angle between the transmission axis of the linear polarizing element and the vertical direction.

2. Active shutter glasses for a stereoscopic image projection system, the active shutter glasses comprising:
a right-eye shutter: and
a left-eye shutter,
wherein the right-eye shutter and the left-eye shutter each include a liquid crystal layer and a linear polarizing element,
at least one of the right-eye shutter and the left-eye shutter includes a layer adopted to change a vibration direction of polarized light,
the linear polarizing element is provided at the outer side of the liquid crystal layer,
the layer adopted to change a vibration direction of polarized light is provided at the outer side of the linear polarizing element,
the layer adopted to change a vibration direction of polarized light changes a vibration direction of incoming polarized light into a direction parallel to a transmission axis of the linear polarizing element,
the layer adopted to change a vibration direction of polarized light is a liquid crystal film including nematic liquid crystal molecules that are twisted in a thickness direction of the film,
a long axis of each of the liquid crystal molecules in the inner surface is substantially perpendicular to the transmission axis of the linear polarizing element, and
a long axis of each of the liquid crystal molecules in the outer surface is substantially perpendicular to the vertical direction.

3. The active shutter glasses according to claim 1, wherein the layer adopted to change a vibration direction of polarized light is provided both in the right-eye shutter and the left-eye shutter.

4. The active shutter glasses according to claim 1, wherein the layer adopted to change a vibration direction of polarized light is provided in either one of the right-eye shutter and the left-eye shutter.

5. A stereoscopic image projection system, comprising:
the active shutter glasses according to claim 1; and
a liquid crystal display device.

6. The active shutter glasses according to claim 2, wherein the layer adopted to change a vibration direction of polarized light is provided both in the right-eye shutter and the left-eye shutter.

7. The active shutter glasses according to claim 2, wherein the layer adopted to change a vibration direction of polarized light is provided in either one of the right-eye shutter and the left-eye shutter.

8. A stereoscopic image projection system, comprising:
the active shutter glasses according to claim 2; and
a liquid crystal display device.

* * * * *